United States Patent
Byren et al.

[11] Patent Number: 5,974,060
[45] Date of Patent: Oct. 26, 1999

[54] MULTI-MODE LASER OSCILLATOR WITH LARGE INTERMODE SPACING

[75] Inventors: Robert W. Byren, Hermosa Beach; Robin A. Reeder, El Segundo, both of Calif.

[73] Assignee: Raytheon Company, Lexington, Mass.

[21] Appl. No.: 09/225,606

[22] Filed: Jan. 5, 1999

[51] Int. Cl.$^6$ ...................................................... H01S 3/098
[52] U.S. Cl. ................................ 372/19; 372/69; 372/70; 372/10; 372/108
[58] Field of Search ................................. 372/19, 10, 18, 372/69, 70, 29, 98, 99; 378/108

[56] References Cited

U.S. PATENT DOCUMENTS

| | | | |
|---|---|---|---|
| 4,410,992 | 10/1983 | Javan | 372/20 |
| 4,752,931 | 6/1988 | Dutcher et al. | 372/19 |
| 5,099,486 | 3/1992 | Acharekar et al. | 372/29 |
| 5,235,505 | 8/1993 | Rines et al. | 372/20 |
| 5,305,334 | 4/1994 | Margalit et al. | 372/29 |

*Primary Examiner*—Leon Scott, Jr.
*Attorney, Agent, or Firm*—Colin M. Raufer; Leonard A. Alkov; Glenn H. Lenzen, Jr.

[57] ABSTRACT

A laser crystal (25) having a relatively short optical length functions as a seed laser (1) and simultaneously establishes the wide separation between longitudinal modes. Pulsed operation causes multiple longitudinal modes to co-exist before competition acts to extinguish modes. The seed laser (1) is isolated from the relatively higher peak power output beam (4). Further, the injection seeded slave resonator (6) optical cavity length is adjusted by mechanical, electromechanical and/or electro-optical component(s) to harmonize the slave resonator optical cavity to the seed laser (1) optical cavity. A number of widely separated longitudinal modes are simultaneously output as a pulsed, high optical quality beam having a broad frequency range, short temporal coherence, and stable simultaneous operation of the several modes.

9 Claims, 4 Drawing Sheets

MULTI-MODE LASER OSCILLATOR WITH LARGE INTERMODE SPACING

TECHNICAL FIELD

This invention relates to lasers, and more particularly to multiple longitudinal mode lasers with a relatively large intermode spacing.

BACKGROUND

A laser is a device that produces optical radiation through the process of amplified stimulated emission in an excited medium. A laser resonator is a laser device that uses positive optical feedback in conjunction with an excited lasing medium to build up large optical field intensities either from radiation noise or from an injected lower power optical field. The allowable frequencies of optical radiation within a laser resonator are termed "longitudinal modes" and are given by the equation $v_m = mc/2nl$, where $v_m$ is the frequency of optical radiation for the $m^{th}$ order longitudinal mode, c is the vacuum speed of light, n is the index of refraction of the medium (assuming it to be uniform within the resonator), and l is the physical length of the resonator optical cavity, i.e. the separation between the resonator mirrors. The spacing between adjacent longitudinal modes is therefore $\Delta v = v_m - v_{m-1} = c/2nl$. Replacing the quantity, nl, by a single parameter, L, which is termed the "optical length" of the resonator, gives $\Delta v = c/2L$. The optical length is a useful parameter even when more than one optical medium is present within the laser resonator.

Very short laser resonator cavities, i.e. small L, have been used to produce large spacings between longitudinal modes. "Microlasers", also called "microchip lasers," have been developed which use a very short laser crystal that is closely coupled to a laser diode. The laser diode excites the ions within the lasing medium through optical pumping on an absorption line. The transverse mode structure is determined by the size of the region within the laser crystal that is pumped, also called the "pumped volume," relative to the region in which a particular mode is confined, also called the "mode volume."

Every laser medium has a "lineshape function" for each allowable energy transition which represents the probability that a photon of a given frequency will be emitted spontaneously for that particular higher-to-lower energy transition. The width of the lineshape function is a characteristic of the lasing medium and is determined by one or more mechanisms which may act on each species (atom, ion, or molecule) in exactly the same way (homogeneous broadening) or treat each in a different way (inhomogeneous broadening). The height of the lineshape function is a measure of the amplification or optical gain that the laser provides as a function of the optical frequency. The highest gain occurs at the peak of the lineshape function.

A laser resonator surrounding a homogeneously broadened laser medium will lase simultaneously in all longitudinal modes of the resonator above the lasing threshold, which is the point at which the round trip optical gain in the laser medium just equals the round trip optical loss within the resonator due to absorption and mirror reflectivity. If the intermode spacing for the resonator, $\Delta v$, is smaller than the width of the lineshape function, it is possible for the laser to lase on multiple longitudinal modes. For continuous (or CW) lasing, however, the gain is clamped to its threshold value and only those longitudinal modes right at the peak of the lineshape function will experience a net gain and lase. This is not a stable situation, because the gain for the various longitudinal modes vary in a random manner due to, for example, resonator length changes caused by room vibration. This variation in mode gain results in random mode hopping, as low amplitude modes can receive sufficient gain to grow and become dominant at the expense of the previously dominant modes. Because of this intense mode competition during continuous lasing, few modes ever lase at the same time.

A Q-switched laser is one in which the loss within the cavity is maintained in a high state (low Q) during the time the medium is being excited, allowing the gain to build to a high value, and then abruptly switched to a low state, at which time lasing occurs and a high energy pulse is extracted.

In a gain switched laser, the optical gain is changed from a below-threshold level to an above-threshold level and back down in order to generate the laser pulse. If the pumping rate is sufficiently high, the gain can be forced high enough above threshold in a short enough period of time that multiple longitudinal modes will build from noise and lase before gain clamping has had time to cause mode discrimination. The output power in each mode will vary somewhat for a variety of reasons. First, the differential gain between modes will cause the output power to follow the lineshape function. Modes further from line center will therefore have lower output power. Second, because oscillation starts from noise with each longitudinal mode starting from independent stray photons, the output power will be higher in modes that start early. The time it takes to seed a mode, relative to the pulse buildup time, therefore, helps determine the magnitude of the variation in power from mode-to-mode. Third, over time the lasing process will clamp the gain at the threshold value due to depletion of the population inversion within the medium and a single dominant mode will emerge as described above in the CW lasing case.

Both Q-switched and gain switched laser resonators can be forced to operate on a single longitudinal mode by injection seeding the resonator with an external laser beam that is tuned to the same frequency as the desired longitudinal mode. Alternatively, the frequency of the external seed laser beam can be fixed and the length of the original resonator adjusted to control the frequency of the desired mode so that it coincides with the fixed frequency of the seed laser. In this case the original resonator is termed a "slave resonator" because its desired resonant frequency is slaved to the seed laser. In both cases, lasing will occur only in the desired longitudinal mode because the buildup time from the seed beam is so much faster than any other unseeded mode that must build up from random noise photons.

While some applications of lasers prefer emission on a single longitudinal mode, there exist other applications for which simultaneous emission on several longitudinal modes is desirable. Active tracking and wavefront sensing systems using speckle averaging at a remote target to minimize amplitude jitter in the return signal are two examples of applications for which multiple emission modes are desirable. For many of these applications, it is desirable to have high optical quality beams, a broad range in frequency across the several modes (i.e. short temporal coherence length), high power output, and stable operation of the several modes simultaneously.

Master Oscillator Power Amplifier (MOPA) laser topology has been used to provide high optical quality and high output power laser beams. Nonlinear optical phase conjugation is often used with the MOPA topology to correct thermally induced optical distortions in the power amplifier elements. The theory of operation of a phase conjugate MOPA is described in Koechner, W., *Solid-State Laser Engineering, Second* Edition, pp. 535–539, Springer-Verlag, Berlin, 1988.

The phase conjugate mirror components typically used in short pulse MOPA topologies are based on stimulated Brillouin scattering (SBS). The SBS process is well known in the art and is also described in Koechner. Because the acoustic waves in the Brillouin medium are receding, the optical frequency of the output beam will be shifted to a longer frequency than the oscillator beam due to the Doppler effect. The Brillouin medium can be a solid, liquid, or gas, and the magnitude of the Stokes shift in optical frequency is dependent on the speed of sound in the medium.

For highly distorting power amplifier media, such as highly pumped rod-shaped laser crystals that are actively cooled along the cylindrical surface of the rod, it is advantageous to confine the laser beam while propagating within the Brillouin medium using an optical lightguide. The incident beam is focused into a Brillouin medium such that the electrical field strength of the optical beam within the medium is sufficient to cause motion of the atoms or molecules through electrostriction. This sets up a series of receding acoustic waves in the medium that scatter the incident beam in the backward direction. The phase fronts of the acoustic waves have exactly the same shape as the phase front of the incident optical beam, therefore the backscattered beam will also have the same phase front but will be traveling in the opposite direction. This process of phase front reversal is known as phase conjugation and has the property that any optical ray entering the phase conjugate mirror will be retroreflected, i.e., will retrace its propagation path back to the source. This approach has been shown to provide good phase conjugate mirror reflectivity and fidelity with incident beams up to 75 times the diffraction limit. The lightguide approach is also advantageous when using the method of Basov described in Basov, N. G., Efimkov, V. F., Zubarev, I. G., Kotov, A. V., Mikhailov, S. I., and Smirnov, M. G., "Inversion of Wavefront in SMBS of a Depolarized Pump" (*JTEP Letters*, Vol. 28, No. 4, pp. 197–201, August 1978) to correct for depolarization of the laser beam in the power amplifier caused by thermally induced stress birefringence.

Lightguide phase conjugate mirror arrangements operate most efficiently and effectively when the temporal coherence length of the incident beam is longer than the round trip propagation time in the lightguide. Longitudinal modes that are separated in frequency by more than $c/I_c$, where c is the speed of light and $I_c$ is the temporal coherence length, are treated as independent beams within the phase conjugate mirror and each must well exceed the conjugation threshold to be effectively conjugated.

SUMMARY

The present invention includes a master oscillator topology suitable for use in a short coherence, phase conjugate MOPA laser system that improves upon the known single-resonator, coupled-resonator, and injection seeded resonator master oscillator topologies to provide a high optical quality, short pulse beam comprised of several stable and widely separated longitudinal modes. A pulsed seed laser with a short resonator cavity length, is used to injection seed a slave resonator. This pulsed operation, which may be implemented through gain switching the laser medium, causes multiple longitudinal modes to co-exist before mode competition acts to extinguish modes off of the lineshape center.

A diode-pumped microlaser may be used as the pulsed seed laser. The pulsed seed laser may be isolated from the slave resonator and the slave resonator may be isolated from the external power amplifier using a non-reciprocal polarization switch such as a Faraday rotator. The slave resonator optical cavity length is preferably adjustable to harmonize the slave resonator optical cavity to the seed laser optical cavity. By the term 'harmonizing' is meant establishing the optical length of the slave resonator cavity to be an integer multiple of the optical length of the seed laser cavity. Further, a Q-switch may be included in the slave resonator cavity to allow energy storage during the pumping period, thereby producing a short, high peak power output pulse with the desired longitudinal mode structure, stability, and uniformity. While desirable, it is not necessary that the seed laser and slave resonator use the same lasing ion and/or host crystal medium.

For applications where the mode seeding times are long and would otherwise result in considerable amplitude variations between the modes, the gain is preferably limited to a level just below threshold for a sufficient period of time to ensure that all longitudinal modes are seeded and thereupon to permit the gain to rise above threshold and thereby output all the desired multiple modes to the slave resonator.

In a presently preferred embodiment, the master oscillator includes a seed laser comprised of a single laser diode end pumping a small laser crystal with dielectric coatings on two parallel surfaces which serve as the resonator mirrors, as well as a slave resonator which includes a solid state laser medium of the same kind as the seed laser, a Q-switch, and a piezoelectric driver affixed to the resonator mirror to control the optical length of the slave resonator cavity. To isolate the amplified output beam of the slave resonator from the seed laser, a Faraday rotator/isolator is interposed between the master and slave cavities with polarization beamsplitters to direct the slave output beam on an optical path separate from that of the optical path from seed laser to slave resonator cavities.

By allowing the seed laser to cover a comparable linewidth (short coherence length) with relatively few longitudinal modes, the energy within each mode is high relative to the SBS conjugation threshold resulting in good conjugation reflectivity and fidelity.

Other features and advantages of the present invention will be apparent from the following more detailed description of the preferred embodiment, taken in conjunction with the accompanying drawings, which illustrate, by way of example, the principles of the invention.

DRAWINGS

DETAILED DESCRIPTION

Figure 1:
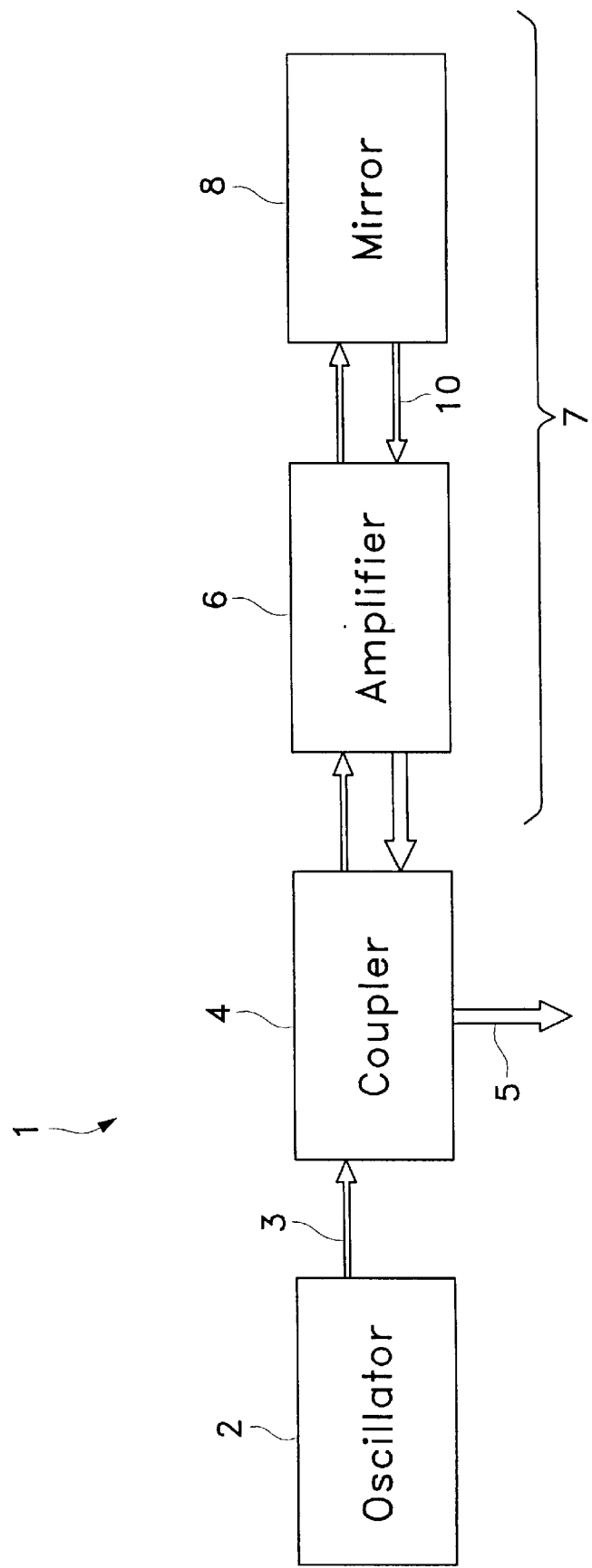
FIG. 1 is a schematic drawing of a MOPA laser system including the master oscillator of the present invention.

A two-pass phase conjugate MOPA system 1 incorporating the present invention is shown in FIG. 1. A master oscillator 2 generates an unamplified output beam 3 that has the desired pulse repetition frequency (PRF), pulse shape, longitudinal mode structure, and output beam quality. An output coupler 4 is used to separate the unamplified output beam 3 from the amplified output beam 5. One or more laser amplifier stages 6 are included within a two-pass power amplifier beamline 7 to increase the pulse energy of the beam 3, typically by several orders of magnitude. A phase conjugate mirror 8 is used to correct the thermal lensing and thermal stress birefringence within the amplifier(s) caused by waste heat generated in the lasing media due to quantum defect, quenching, and linear absorption. The result is a high energy amplified beam 5 that preserves, to a first order, the PRF, pulse shape, longitudinal mode structure, and beam quality of the unamplified master oscillator output beam 3.

Phase front errors of the amplified beam 5 caused by propagation of the high quality oscillator beam 3 through the distorting power amplifier medium or media 6 will be reversed by the phase conjugate mirror 8 (reflected beam 10) such that they are corrected after a second pass through the amplifier 6. The amplified output beam 5 will therefore have the same phase front, i.e., beam quality, as the unamplified beam 3, within the limits set by diffraction within the amplifier beamline. It is desirable, therefore, for applications such as described above to provide a master oscillator output beam 3 that has a relatively few longitudinal modes and that has a large intermode spacing for effective phase conjugation and for good speckle averaging.

Figure 2:
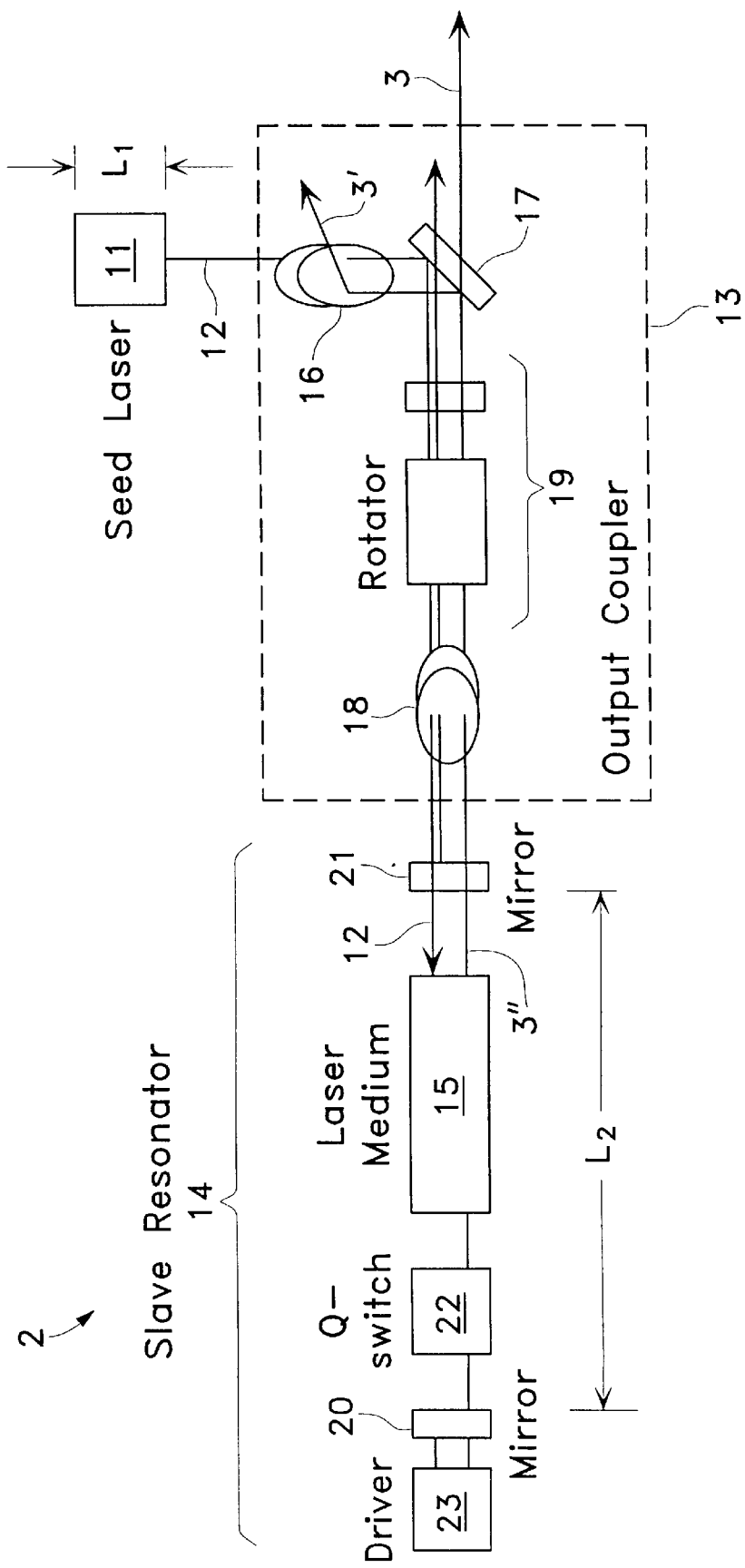
FIG. 2 is a schematic drawing of the master oscillator portion of FIG. 1.

FIG. 2 schematically illustrates the master oscillator portion of the laser system 1, including a seed laser 11 in the form of a microlaser. Seed laser 11 has an optical cavity length of $L_1$ and outputs a seed beam 12 through an output coupler 13 into a slave resonator 14. Laser intensity builds up in slave resonator 14 on the longitudinal modes that are seeded by the injected seed beam 12. Those longitudinal modes that are above the lasing threshold in the slave resonator build substantially and couple out through output coupler 13. As will be explained in further detail with respect to FIG. 4, the laser medium 15 of the slave resonator 14 determines (a) the center wavelength of operation; (b) the width of the lineshape function, which affects the number of longitudinal modes that can be supported and the gain uniformity across these modes; and (c) the stimulated emission cross section, which affects the buildup time of the seed modes in the slave resonator.

Output coupler 13 includes polarizing beamsplitters 16, 17 and 18, and nonreciprocal polarization rotator 19. Nonreciprocal rotator 19 may be a 45 degree Faraday rotator and a 45 degree quartz rotator combination. The rotator acts to polarize light traveling in a first direction to be polarized in a first state and to polarize light traveling in a second direction opposite said first direction to be polarized in a second state rotated 90 degrees from said first state. Seed beam 12 from seed laser 11 is first polarized by polarization beamsplitter 16 to a state in which it is directed by polarization beamsplitter 17 into nonreciprocal polarization rotator 19. Beam 3" emerging from slave resonator 14 passes back through polarizing beamsplitter 18 and nonreciprocal polarization rotator 19 in a polarization state which is directed by polarization beamsplitter 17 in a direction other than towards seed laser 11. Polarizing beamsplitters 16, 17 and 18 may be thin film polarizers, birefringent wedges, or any other type.

Polarization beamsplitter 16 acts to isolate seed laser 11 from imperfect beamsplitting by polarization beamsplitter 17 which otherwise would allow some portion 3' of the output beam 3 to be reflected back toward seed laser 11. Polarization beamsplitter 17, in conjunction with polarization rotator 19 and polarization beamsplitter 18, further acts to isolate slave resonator 14 from amplified optical feedback of output beam 3 within a power amplifier beamline which otherwise would allow that optical feedback to be transmitted back toward slave resonator 14.

Slave resonator 14 includes solid-state laser medium 15, a first resonator mirror 20 having a reflectivity of substantially 100% over the operating wavelengths, a second resonator output mirror 21 having a reflectivity of less than 100% over the operating wavelengths and preferably includes Q-switch 22 disposed within the slave resonator cavity 14. Slave resonator 14 has an optical cavity length of $L_2$.

A portion of seed beam 12 emerging from optical coupler 13 towards slave resonator 14 passes through resonator output mirror 21 into solid-state laser medium 15 wherein it seeds the lasing process on specific longitudinal modes that are coincident with seed longitudinal modes. Q-switch 22 causes all of these specific modes to build rapidly in the slave resonator 14 and each relatively low power, relatively long multi-mode input pulse of the seed beam is thereby transformed into a corresponding relatively high power, relatively short multi-mode pulse of the oscillator output beam 3.

Transverse mode discrimination may be used in slave resonator 14 to ensure high beam quality of the output beam 3.

The optical cavity length $L_2$ of slave resonator 14 is determined by the distance and refractive index of all optical media between resonator output mirror 21 and the first resonator mirror 20. The position of 100% resonator mirror 20 may be controlled by a conventional servo control circuit for sensing the cavity mode overlap condition and for adjusting the position of the mirror 20 in a manner which optimizes said condition, for example by generating suitable controls signals to a piezoelectric driver 23 mechanically coupled to the mirror 20. A preferred means of sensing the cavity mode overlap condition is to measure the pulse building time, in which case the position of the mirror is adjusted for shortest building time.

In practice it may not be necessary for the cavity mode spacing $L_1$ of the seed laser 11 to be an exact integral multiple of the slave resonator cavity mode spacing $L_2$. Coarse adjustment of the optical cavity length of the slave resonator $L_2$ can provide adequate control of the relative spacing of cavity modes. Fine adjustment of the position of the mirror 20 is however required to ensure that the modes do overlap in frequency near the center of the emission lineshape function.

Figure 3:
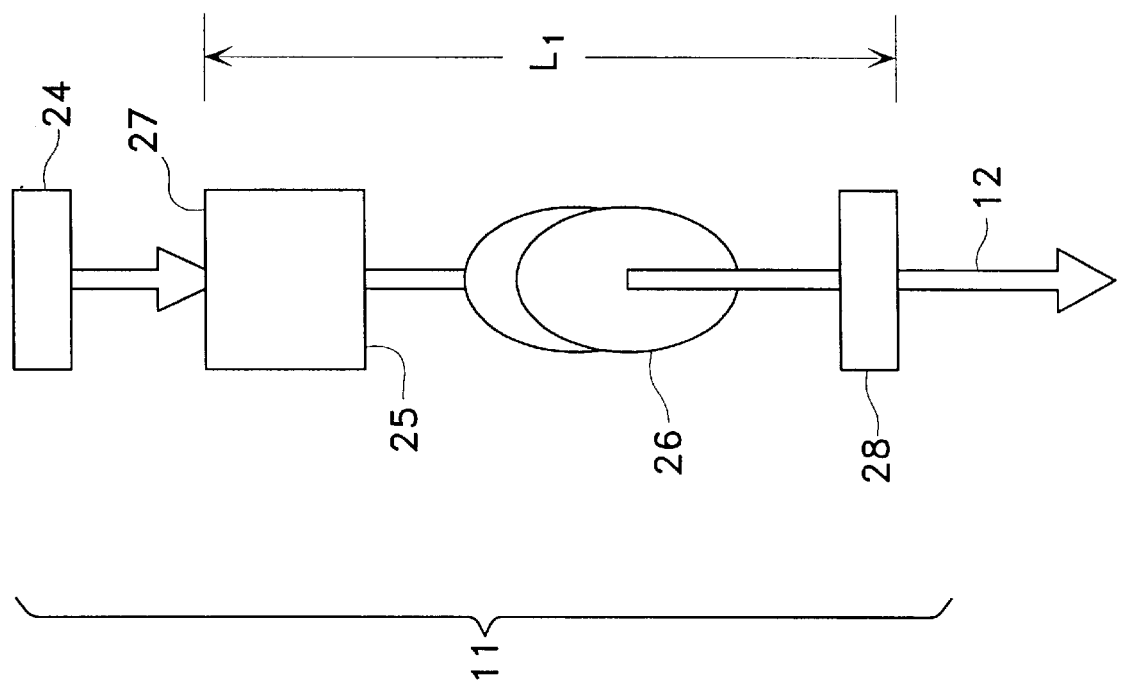
FIG. 3 is a schematic drawing of the seed laser portion of FIG. 2.

FIG. 3 schematically illustrates one embodiment of seed laser 11 portion of laser system according to the present invention. Seed laser 11 includes pump laser diode 24 and small laser crystal 25. In an exemplary embodiment pump laser diode 24 may be a single InGaAs laser diode having a pump wavelength of 941 nm and laser crystal 25 may be ytterbium-doped yttrium aluminum garnet (Yb:YAG) having a lasing wavelength of 1030 nm), although other practical materials and wavelengths will be apparent to those skilled in the art. Known microlaser technology can be used to produce a laser having a cavity length of less than about 1 cm and preferably of about 5 mm, which corresponds to a mode spacing of more than 16.5 GHz, which is much larger than the natural mode spacing of a typical laser resonator (1.25 GHz for a 12 cm cavity length). Seed laser 11 may further include a polarization selective optical element 26. A first seed laser resonator mirror may be embodied as a dichroic coating 27 on laser crystal 25. Dichroic coating 27 may be embodied in a form which substantially passes the wavelength of diode laser pump 24 and further substantially reflects the lasing wavelengths of laser crystal 25. Seed laser 11 further includes a second resonator mirror 28 having a reflectivity of less than 100% at the operating wavelengths of laser system. Second resonator mirror 28 may be embodied as a second coating (not shown, but preferable when a relatively large mode spacing is desired) on the other end of laser crystal 25 or as a coating on a separate optical substrate. Second seed laser resonator mirror 28 is preferably substantially reflective to the wavelength of pump laser diode 24 thereby recapturing any pump light which may have passed through laser crystal 25.

Polarization selective optical element 26 may be disposed within the optical cavity of seed laser 11 and cooperates with Polarization beamsplitter 16 to ensure that the polarization state of output seed beam 12 matches the polarization state of polarizing beamsplitter 16 which transmits seed beam 12 into output coupler 13.

Figure 4:
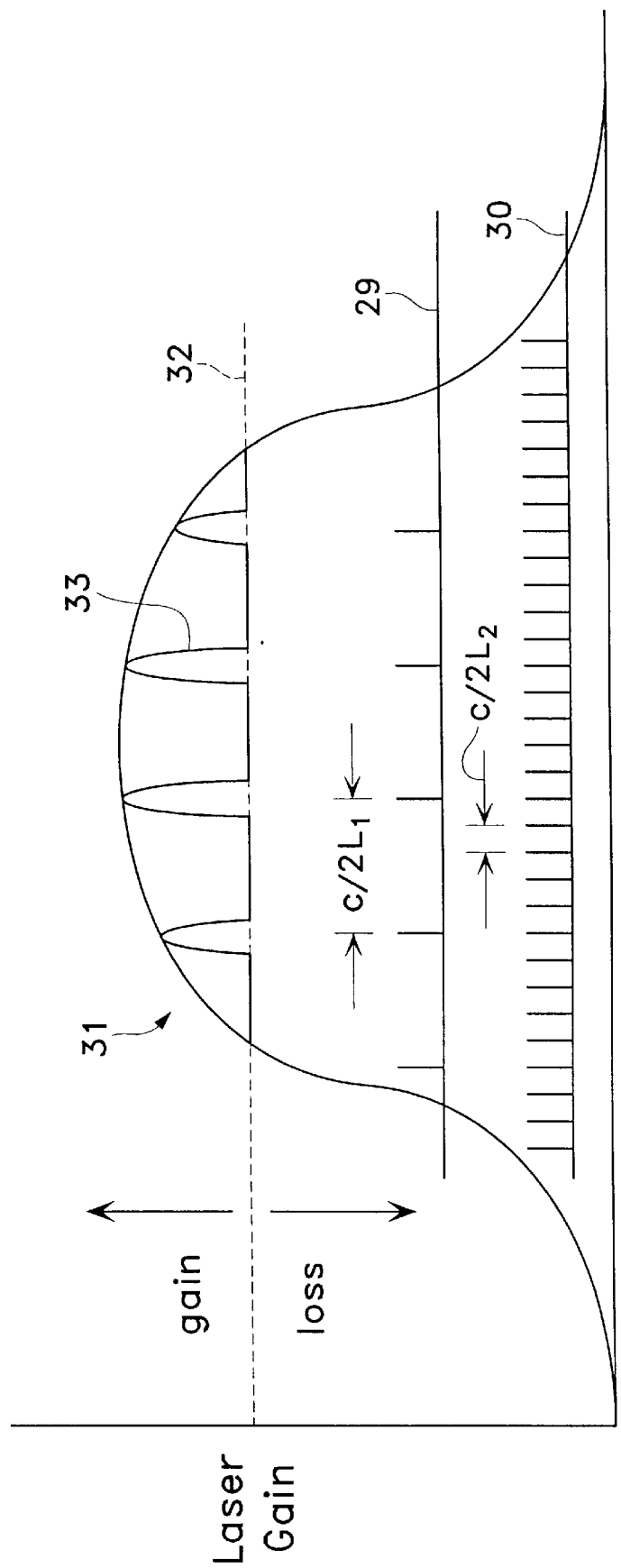
FIG. 4 is a graph illustrating the relationships between longitudinal cavity modes, emission lineshape duration, laser gain/loss and lasing threshold of an exemplary laser system.

FIG. 4 is a graph illustrating the relationships between cavity modes 29 of seed laser 11, cavity modes 30 of slave resonator 14, emission lineshape function 31 of solid-state laser medium 25, laser threshold level 32 of slave resonator 14, and slave resonator output spectrum 33.

The cavity length $L_1$ of seed laser 11 determines the spacing $c/2L_1$ between master oscillator cavity modes 29. Similarly, the cavity length $L_2$ of slave resonator 14 determines the spacing $c/2L_2$ between slave resonator cavity modes 30.

The cavity length $L_1$ of seed laser 11 and laser medium 25 may thus be selected to ensure a desired separation between the seed laser cavity modes 29 relative to the 50% points of emission lineshape function 31. By way of example, the full spectroscopic linewidth emission of Yb:YAG to the 50% points is approximately $2.6 \times 10^{12}$, which results in approximately 7 discrete seed laser cavity modes for a cavity length of 5 mm.

Similarly, solid-state laser medium 15 may be selected to ensure that the corresponding master oscillator emissions 33 are within the 50% points of the emission lineshape function 31 and the cavity length $L_2$ of slave resonator 14 may be adjusted such that at least those slave resonator cavity modes 30 associated with the master oscillator emissions 33 substantially overlap in frequency the corresponding seed laser cavity modes.

Piezoelectric driver 23 or other servo control mechanism acts to adjust the spacing of resonator cavity modes 30 to maintain the spacing of the master oscillator cavity modes 29 such that they have the desired relationship to the spacing of resonator cavity modes 30, for example by minimizing the build up time between the activation of Q-switch 22 and the detection of an output pulse on oscillator output beam 3.

When the above conditions (pulsed operation of the seed laser above its lasing threshold to produce a seed beam with a selected number of seed laser cavity longitudinal modes within the lasing region of the resonator emission linewidth envelope, frequency overlap of each of those selected seed cavity modes with a corresponding longitudinal mode of the slave resonator cavity to produce a quasi-harmonic in-phase relationship between the mode spacings of the seed laser and the slave resonator cavities) are satisfied, the desired number of widely separated longitudinal modes are simultaneously seeded, caused to oscillate and output as a single short pulse laser beam.

What is claimed is:

1. An optical oscillator, comprising:
   a seed laser having a first cavity with a relatively short first optical length which emits a seed beam pulse comprising multiple longitudinal modes having a relatively large intermode spacing determined by said first optical length;
   a slave resonator which is injection seeded by said seed beam pulse from said seed laser, said slave resonator having a second cavity with a second optical length substantially greater than the first optical length and an associated inherent intermode spacing that is substantially less than said relatively large intermode spacing, said second optical length being substantially equal to a predetermined integer times said first optical length such that any lasing in said second cavity in response to said seed beam pulse will be substantially confined to said multiple longitudinal modes having said relatively large intermode spacing; and
   a slave resonator laser medium within said second cavity that has an emission lineshape function including a region that is substantially broader than several times said relatively large intermode spacing times said predetermined integer.

2. The optical oscillator of claim 1, further comprising:
   a mechanism to adjust a laser threshold of the slave resonator laser medium relative to the emission lineshape function such that said threshold is not exceeded until all said multiple longitudinal modes have been seeded.

3. The optical oscillator of claim 1, wherein said seed beam of said seed laser is caused to pass into and injection seed said slave resonator only on cavity modes of said seed laser.

4. The optical oscillator of claim 1, wherein the gain of said seed laser is caused to remain below lasing threshold level for a sufficient time so as to ensure that all said modes of said seed beam are each and severally excited.

5. The laser system of claim 1 wherein said slave resonator comprises a Q-switch disposed within the optical cavity of said slave resonator.

6. The laser system of claim 1 wherein said seed laser is a microlaser comprised of a laser diode pump source, and a laser crystal, and having a optical length substantially less than an optical length of said slave resonator.

7. The optical oscillator of claim 1 further comprising an isolator wherein said seed beam is substantially directed towards and allowed to pass into said slave resonator, the output or any other reflected portion of said seed beam is substantially directed away from, and not allowed to pass into said seed laser, and said slave resonator does not alter that property of the light which causes it first to pass into said slave resonator and subsequently to not pass into said seed laser upon emerging from said slave resonator.

8. The optical oscillator of claim 7 further comprising a second isolator wherein any externally reflected or scattered portion of the output beam from said slave resonator is substantially directed away from and not allowed to pass into said seed laser or said slave resonator.

9. A laser system comprising the optical oscillator of any one of the preceding claims and further comprising:
   a two pass beamline including a power amplifier and a phase conjugate mirror; and
   an output coupler between the optical oscillator and the beamline.

* * * * *